Feb. 9, 1926. 1,572,053
R. H. VILLARD
COMPRESSED RUBBER AND AIR CUSHION FOR TIRES
Filed Dec. 14, 1923 2 Sheets-Sheet 2
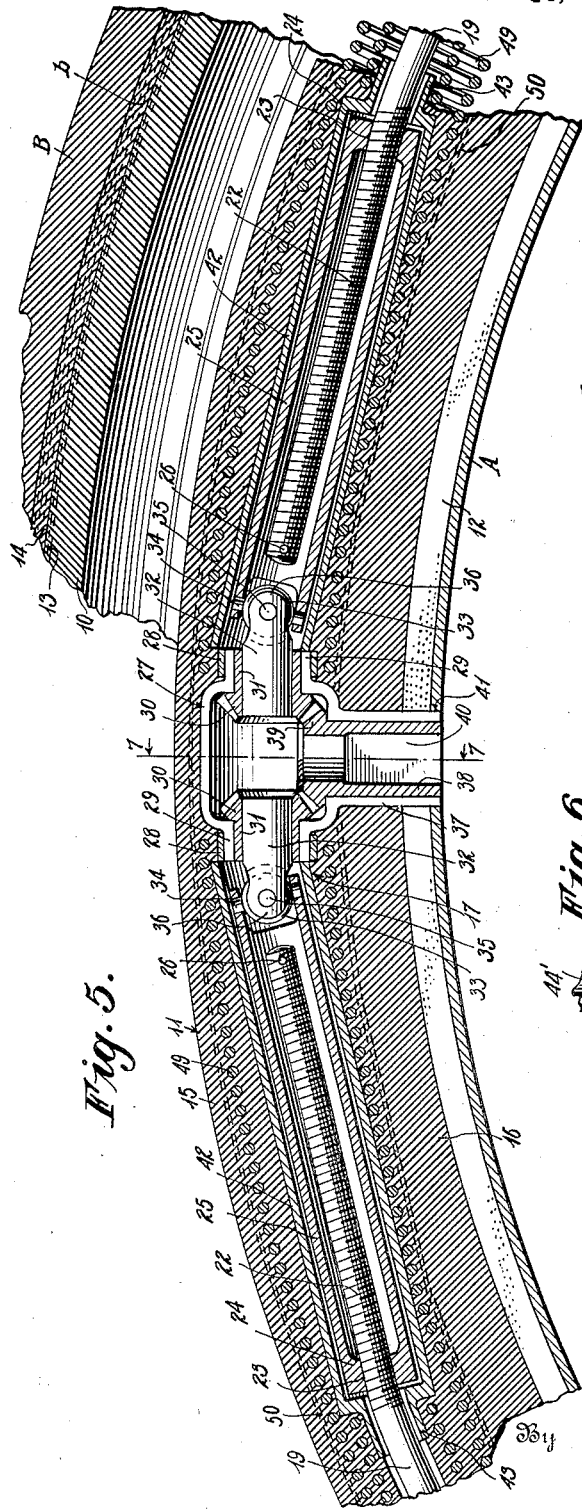
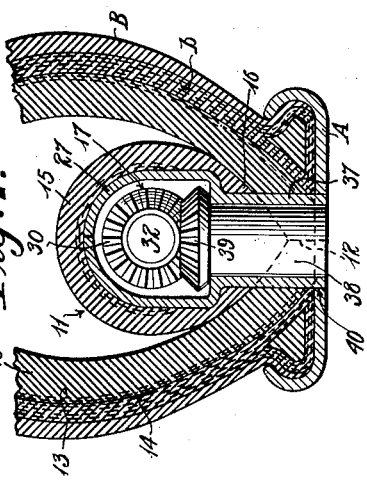
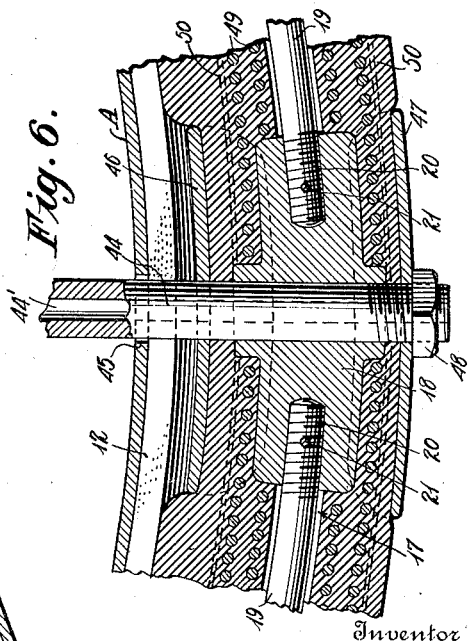
Inventor
Richard H. Villard
By Brown + Phelps
Attorneys Patented Feb. 9, 1926.

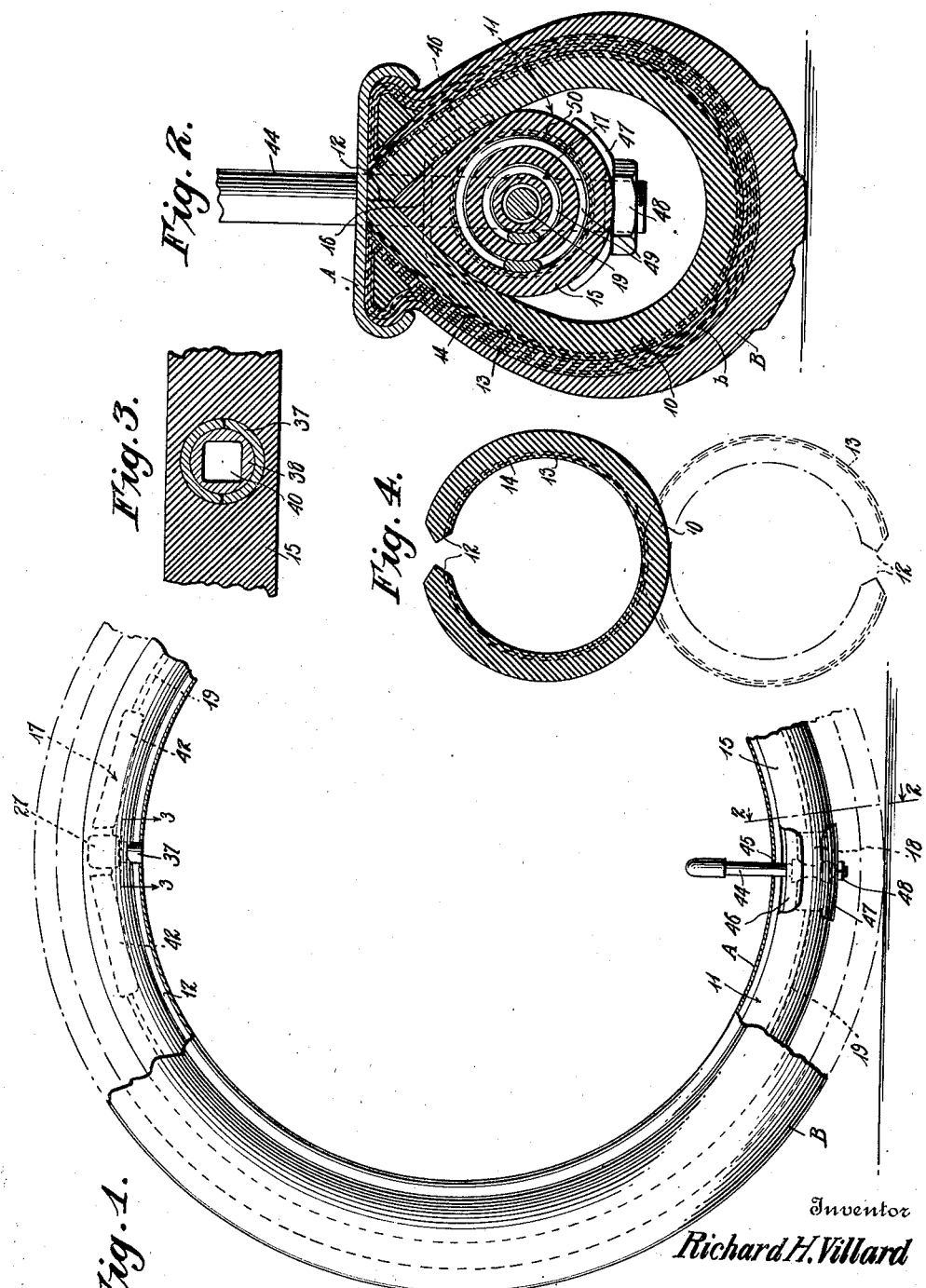

1,572,053

UNITED STATES PATENT OFFICE.

RICHARD H. VILLARD, OF ATLANTA, GEORGIA.

COMPRESSED RUBBER AND AIR CUSHION FOR TIRES.

Application filed December 14, 1923. Serial No. 680,711.

*To all whom it may concern:*

Be it known that I, RICHARD H. VILLARD, a citizen of the United States, residing at Atlanta, in the county of Fulton and State of Georgia, have invented certain new and useful Improvements in Compressed Rubber and Air Cushions for Tires, of which the following is a specification.

This invention relates to a tire for vehicle wheels and it is generally aimed to provide a construction which utilizes in part the pneumatic principle, but employs in lieu of the usual inner tube or bladder, a novel means which renders the tire substantially proof against puncture and blow-out, prolonging the life of the casing and particularly its side walls, and which will sustain the weight of the vehicle sufficiently for practical usage to avoid the necessity of immediate repair should the air exhaust or leak from the tire.

A particular object is to provide an inner shoe in lieu of the inner tube which will be compressed when installed and subject to pneumatic pressure to attain the ends aforesaid, and preferably of such a construction as has a cushioning rubber body so reinforced by fabrics that the body may be turned inside out with the fabric serving to compress the rubber.

Another aim is to provide a tire which requires inflation to a relatively low degree so that it may expand without danger of blow-out to accommodate frictional heat developed during the travel, to provide a tire which, due to greater resiliency, will be less destructive upon both the vehicle and the road bed, and further to provide a tire in which the said frictional heat is efficiently dissipated into the atmosphere.

A further desideratum is to provide a novel and efficient contractile and expansible means incapable of circumferential movement independently of the tire to coact with the distal edge portions of the inner shoe to hermetically close the inner shoe and to clamp the same and the outer shoe or casing to the rim.

Servient objects and advantages will appear from a consideration of a practical embodiment as disclosed in accompanying drawings taken with the description following:

In said drawings, Figure 1 is a fragmentary side view, partly broken away, disclosing a tire constructed in accordance with the present invention; Figure 2 is a sectional view on an enlarged scale taken on the plane of line 2—2 of Figure 1; Figure 3 is a detail sectional view taken on the plane of line 3—3 of Figure 1; Figure 4 is a radial sectional view through the inner shoe alone, showing it in original shape in full lines and from which it is shaped into the dotted line form for use; Figure 5 is an enlarged fragmentary vertical central longitudinal sectional view to primarily illustrate the turn-buckle construction; Figure 6 is a section taken on the same plane as Figure 5, but adjacent to the air or inflation tube, and Figure 7 is a section taken on the plane of line 7—7 of Figure 5.

Illustrated at A is a usual channel rim demountably carrying a tire casing or outer shoe B. This may be an ordinary casing in that it has a cross sectionally U-shaped rubber body in which layers $b$ of fabric are embedded.

In place of the ordinary pneumatic bladder or inner tube, an inner shoe 10, generally shaped similar to the casing B, is removably disposed therein in combination with a removable ring or annular means 11 which secures the shoes B and 10 to the rim and hermetically seals the latter shoe adjacent to its slit or distal edge portions 12.

Inner shoe 10 consists of a relatively thick body of rubber in the same pliant state or condition as an ordinary inner tube, when such shoe is in its original untensioned and uncompressed condition as shown by full lines in Figure 4. Adjacent to one wall of the inner shoe and practically coextensive therewith are one or more layers of fabric or other inelastic material 13 which are secured in place by vulcanizing rubber 14 to its rubber body through the interstices of the fabric and which form a protective layer on the opposite side of the fabric to the body. Prior to placing shoe 10 into the shoe B between the edge portions of the latter, the walls of the shoe 10 are reversed, or in other words shoe 10 is turned inside out, as suggested by the dotted line form in Figure 4 and which conforms to the form it has in the other figures. Due to this reversal of the inner shoe, its body, since fabric 13 is inelastic and outwardly thereof, is compressed.

Said ring or annular means 11 has an elastic body 15 of rubber, for instance, similarly pliant to that of the body of shoe 10 and it preferably tapers or is wedge-shaped in section at 16 to enable contiguous engagement as shown with the inner walls of said shoe. A contractile and expansible clamping mechanism generally designated 17 is located within body 15. This mechanism employs metallic parts and specifically a coupling 18 in which the adjacent end portions of substantially semi-circular somewhat flexible rods 19 are screw-threaded at 20 and pinned at 21 (see Figure 6). Rods 19 intermediate their ends are unattached to body 15 and sufficient clearance is afforded for their operation. The other end portions of rods 19 (see Figure 5) may be straight and have screw-threads at 22 engaged with screw-threads 23 in end or nut portions 24 of rotatable turnbuckle tubes 25. Said straight end portions are secured against detachment from tubes 25 by pins 26.

27 indicates a casing or housing preferably made in two sections separable on the plane of Figure 5 and held together by collars or ferrules 28 initially tapered and driven tightly onto bearing extensions or flanges 29 thereof. Bevel or miter gear wheels 30 are located in casing 27 and have reduced sleeves 31 journaled in extensions 29 and held against outward displacement by the gear wheels proper. Said gear wheels are carried by stub shafts 32 which are substantially universally joined to the turn-buckle tubes 25. As one form, each universal or flexible joint comprises a ball 33 having trunnions 34 pivoted in the tubes 25 and trunnions 35 pivotally disposed in extensions 36 of the stub shafts 32. The axes of trunnions 34 and 35 are at a right angle to each other.

Casing 27 has a radial bearing extension or sleeve 37 in which a shank or shaft 38 of a miter or bevel gear wheel 39 is journaled. The gear wheel 39 meshes with and is adapted to operate the gear wheels 30 as through the manipulation of a suitable crank-operable tool (not shown) detachably applicable to a square socket or recess 40 of the shank 38. The gear wheel 39 proper rests on the inner surface of casing 27 and is thus maintained in place. Rim A has an opening 41 which sleeve 37 occupies to render recess 40 accessible and to prevent circumferential movement of the tire independently of the rim or wheel. The aforesaid parts form a turn-buckle.

Although not essential, the turn-buckle tubes 25 may be housed in metallic barrels or casings 42 fixedly embedded in body 15. Rods 19 pass freely through one end of the barrels and in order to prevent chafing of the body 15 by the screw-threads of the rods, such barrels may have tubular extensions 43 at said ends.

Substantially diametrically opposite to the turn-buckle, the tire is also secured against circumferential movement independently of the rim or wheel by an air tube 44 as it projects through an opening 45 of rim A. This tube has an air inlet passage 44' longitudinally thereof under control of a usual air valve (not shown) and opening interiorly of shoe 10. Tube 44 detachably passes through coupling 18 and has a transversely arcuate clamp plate 46 welded to it which engages the body 15. A companion transversely arcuate clamp plate 47 engages the body 15 opposite to said plate 46 and tube 44 passes separably through it and beyond the same has a nut 48 threaded thereon. Tightening of nut 48 serves to move plate 47 so that the body 15 will be compressed between the plates 46 and 47 tightly about tube 44.

Optionally employed and embedded in body 15 and coiled concentrically with the axis of rods 19 and about the parts of the clamping mechanism, are metallic wires or textile cords 49 and fabric strips 50 which reinforce and facilitate contraction and expansion of said body.

In some instances, a self-vulcanizing cement, that is one which vulcanizes merely by action of air at atmospheric temperature without the addition of heat, may be applied to the contacting surfaces of the shoe 10 and body 15 or elsewhere to positively guard against air leakage to render shoe 10 hermetic.

In assembling the parts of the tire into operative form, before casing B is applied to rim A, shoe 10 is reversed from the full line to the dotted line position of Figure 4 so as to compress its body, and it is then inserted into casing B. Then ring or securing means 11, with rods 19 sufficiently expanded to pass over rim A, is placed within the shoe 10. These parts are then applied in the same manner as an ordinary tire to the rim A, with sleeve 37 occupying opening 41 and air tube 44 projecting through opening 45. At this stage a tool is applied to socket 40 and turned in the appropriate direction to rotate gear wheel 39, gear wheels 30, stub shafts 32 and tubes 25 due to their substantially universal connection to stub shafts 32. As a result, nuts 23 act on screw-threads 22 to contract the rods 19 and clamp the body 15 as at the portion 16 in contiguous hermetic engagement with the wall of shoe 10 adjacent slit 12. Inflating air is now supplied through the tube 44 to the air chamber within shoe 10. Vulcanizing cement as previously mentioned, when employed, obviously is applied to the desired surfaces before the tire is assembled. The reverse operation to that outlined is followed in removing the tire, but if the aforesaid vulcanizing cement has been used, a solvent therefor is usually inserted through the air tube 44 and permitted to stand a short time so that it will act on such cement before removal of the tire is attempted.

In such a tire, due to the compressed shoe 10, it is not susceptible to puncture or blowout in the ordinary way. The casing walls are always taut and the usual stretch of the casing is absorbed which prolongs the life of the tire particularly since the side walls of the casing will never have to sustain the load nor alone be subjected to the usual severe shocks and strains incidental to travel and since the casing tread or tractive portion of the tire is under less tension than the inner shoe. Should the air within the tire exhaust from any cause, immediate repair is not essential to further travel, since the compressed shoe 10 will maintain the tire in an operative condition practically indefinitely and at least until repair can conveniently be made. This tire uses about one-third the air pressure of ordinary tires and the frictional heat is reduced as there is no danger of slippage of the tire about the rim and since the metallic parts of the clamping mechanism absorb such heat and dissipate it into the atmosphere at the sleeve 37 and tube 44.

I claim:—

1. In combination with a tire casing, a shoe therein with its original inner surface outermost, said shoe consisting of a body substantially of elastic material and coextensive with the inner surface of the casing, said body having an inelastic strip adjacent said original inner surface, whereby through reversal of the body said strip compresses the body and contractile means operable to close the body.

2. In combination with a tire casing, a shoe therein with its original inner surface outermost, said shoe consisting of a body substantially of rubber and coextensive with the inner surface of the casing, and said body having an inelastic strip adjacent said original inner surface, whereby through reversal of the body said strip compresses the body, and means to hermetically close the body.

RICHARD H. VILLARD.